Jan. 11, 1938. G. H. HUNT 2,105,323
BRAKE
Original Filed Sept. 16, 1933
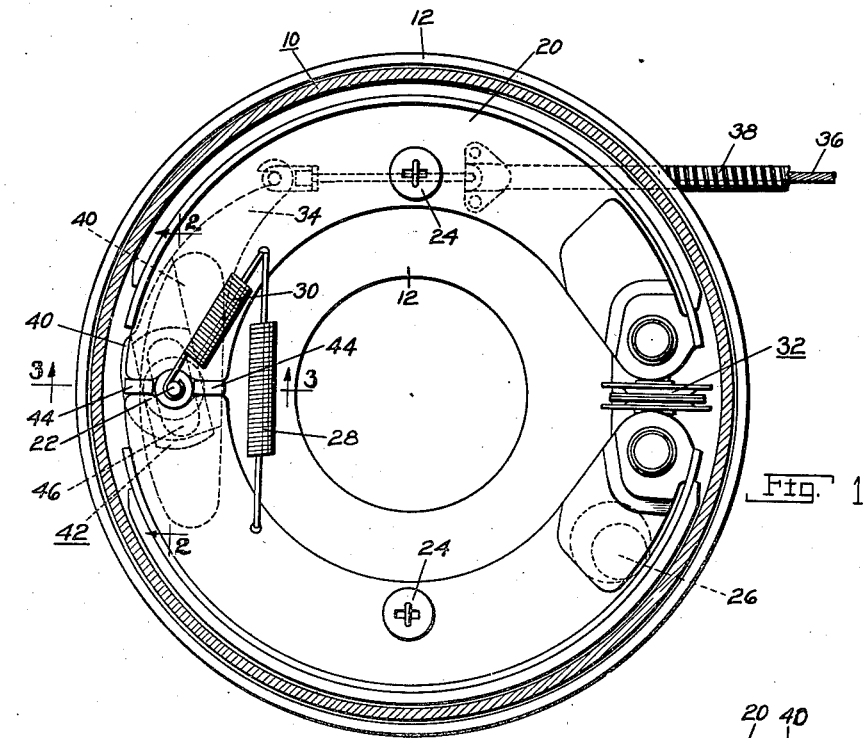
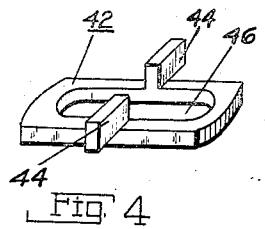
Fig. 4
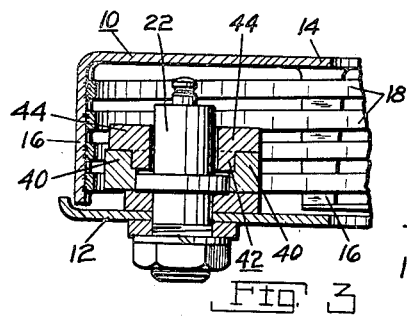
Fig. 3
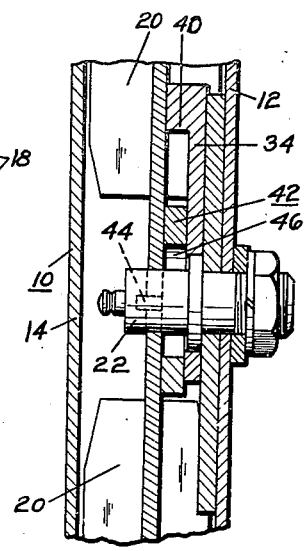
Fig. 2
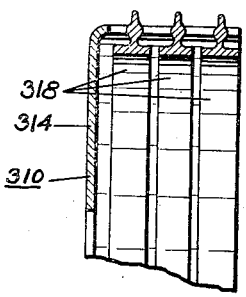
Fig. 6
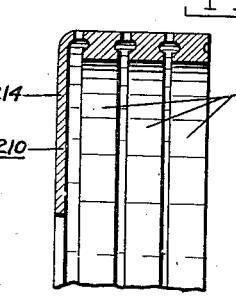
Fig. 5
INVENTOR.
GEORGE H. HUNT.
BY
ATTORNEY Patented Jan. 11, 1938

2,105,323

UNITED STATES PATENT OFFICE 2,105,323

BRAKE

George H. Hunt, Detroit, Mich., assignor to Bendix Aviation Corporation, South Bend, Ind., a corporation of Delaware Original application September 16, 1933, Serial No. 689,728, now Patent No. 2,074,727, dated March 23, 1937. Divided and this application February 29, 1936, Serial No. 66,331

3 Claims. (Cl. 188—78)

This invention relates to brakes, and is illustrated as embodied in a shiftable anchorage brake having a single anchor.

An object of the invention is to provide a novel applying lever having simple force-equalizing means, preferably a slideway or guide receiving a slide having brake-applying thrust parts engaging the shoes or their equivalents. This permits balancing the thrusts on the shoes, the slideway being approximately perpendicular to a brake radius when the brake is applied. Preferably the lever is pivotally mounted on the brake anchor.

Another feature of novelty resides in the provision of brake drums having improved ventilating characteristics and means for discharging dust and grease. These brake drums are preferably composed of a plurality of parallel spaced rings or a helically wound metal strip secured to a spider.

The above and other objects and features of the invention, including various novel arrangements and desirable particular constructions, will be apparent from the following description of the illustrative embodiments shown in the accompanying drawing in which:

Figure 1 is a vertical section through a brake just inside the head of the brake drum with the shoes shown in side elevation;

Figure 2 is a partial section on the line 2—2 of Figure 1 showing the brake anchor and applying means;

Figure 3 is a partial radial section on the line 3—3 of Figure 1 also showing the brake anchor and applying means;

Figure 4 is a detailed perspective view of the slide with its brake shoe engaging parts;

Figure 5 is an axial section through a modified form of brake drum which may be used; and Figure 6 is a section similar to that of Figure 5 illustrating another modified form of brake drum.

The brake illustrated in Figures 1 to 4 includes a rotatable drum 10, at the open side of which is a support such as a backing plate 12, and within which is arranged the friction means of the brake. As may be clearly seen in Figure 3 the drum 10 may comprise a head 14 having a plurality of projections 16 spaced about its periphery and bent over to form a cage or spider. The braking surface is formed by a helical strip 18 of high carbon steel or other desirable material welded or otherwise secured to the inside of the projections 16.

The friction means comprises a pair of shoes 20, the left ends of which are formed with rounded notches to seat against opposite sides of an anchor or post 22 secured to the backing plate 12. The shoes may have suitable steady rests 24 and an eccentric adjustable positioning stop 26. A main return spring 28 is tensioned between their anchor engaging ends, and there may also be an auxiliary return spring 30 for the purpose of eliminating anchor click in forward braking.

The right hand ends of the shoes are pivotally articulated by means of a novel adjusting and positioning device 32 more particularly described and claimed in my copending application Serial No. 689,728, filed September 16, 1933 issued March 23, 1937, as Patent No. 2,074,727, of which this application is a division.

My novel applying means may comprise a lever 34 pivoted at its lower end on the anchor 22 adjacent the backing plate and connected at its upper end to a flexible operating cable 36 extending through an opening in the backing plate and enclosed in a flexible conduit 38. The lever 34 is formed with parallel shoulders 40 spaced generally equidistant from the anchor 22 and forming a slideway or guide which, when the lever 34 is in brake released position, extends at an acute angle to a perpendicular to the radius through the anchor. This angle is approximately equal to the angular applying movement of the lever 34 so that, when the lever is in applied position, the slideway lies along the perpendicular to the radius through the anchor.

A slide thrust member 42, adapted to be received by said slideway, is provided with lugs or other thrust parts 44 adapted to engage the ends of the shoe webs on radially opposite sides of the anchor. The member 42 also is formed with an elongated slot 46 surrounding the anchor and having its long axis parallel to the slideway.

In operation, when the applying lever 34 is rotated about its pivot on the anchor, the thrust member 42 is rotated therewith and its lugs 44 engage the shoe ends and spread them. As stated above the slideway moves to a position perpendicular to a radius through the anchor and thus the thrust member is free to shift in either direction to balance the applying forces on the ends of the shoes without causing the applying lever to shift. It will be seen that my novel applying means insures equal action of the applying means in forward and reverse braking.

If desired the drum 210 illustrated in Figure 5 may be employed. This drum comprises a head 214 having cast integrally therewith a peripheral flange cored out to form ribs 218 which are separate from each other for the greater part of the drum circumference.

In Figure 6 the drum 310 has its flange slotted to receive driving projections on rings 318 of high carbon steel.

While several illustrative embodiments have been described in detail it is not my intention to limit the scope of the invention to those particular embodiments or otherwise than by the terms of the appended claims.

What is claimed is:

1. A brake having a pair of floating shoes, an anchor between the ends of the shoes at one side of the brake, a floating joint connecting the ends of the shoes at the other side of the brake, an applying lever pivotally engaging said anchor and formed with a slideway approximately perpendicular (when the brake is applied) to the brake radius passing through the anchor, and a device movably mounted in said slideway and having thrust parts engaging said shoes respectively.

2. A brake having floating friction means with an anchor arranged between its ends, an applying lever pivoted on said anchor and having a slideway arranged (when the brake is applied) approximately perpendicular to the brake radius passing through said anchor, and a device movably mounted in said slideway and having thrust parts engaging said ends of the friction means respectively.

3. A brake having an anchor, an applying lever pivoted on said anchor and having a slideway arranged (when the brake is applied) approximately perpendicular to the brake radius passing through said anchor, and a device movably mounted in said slideway and having brake-applying thrust parts.

GEORGE H. HUNT.